Figure 1:
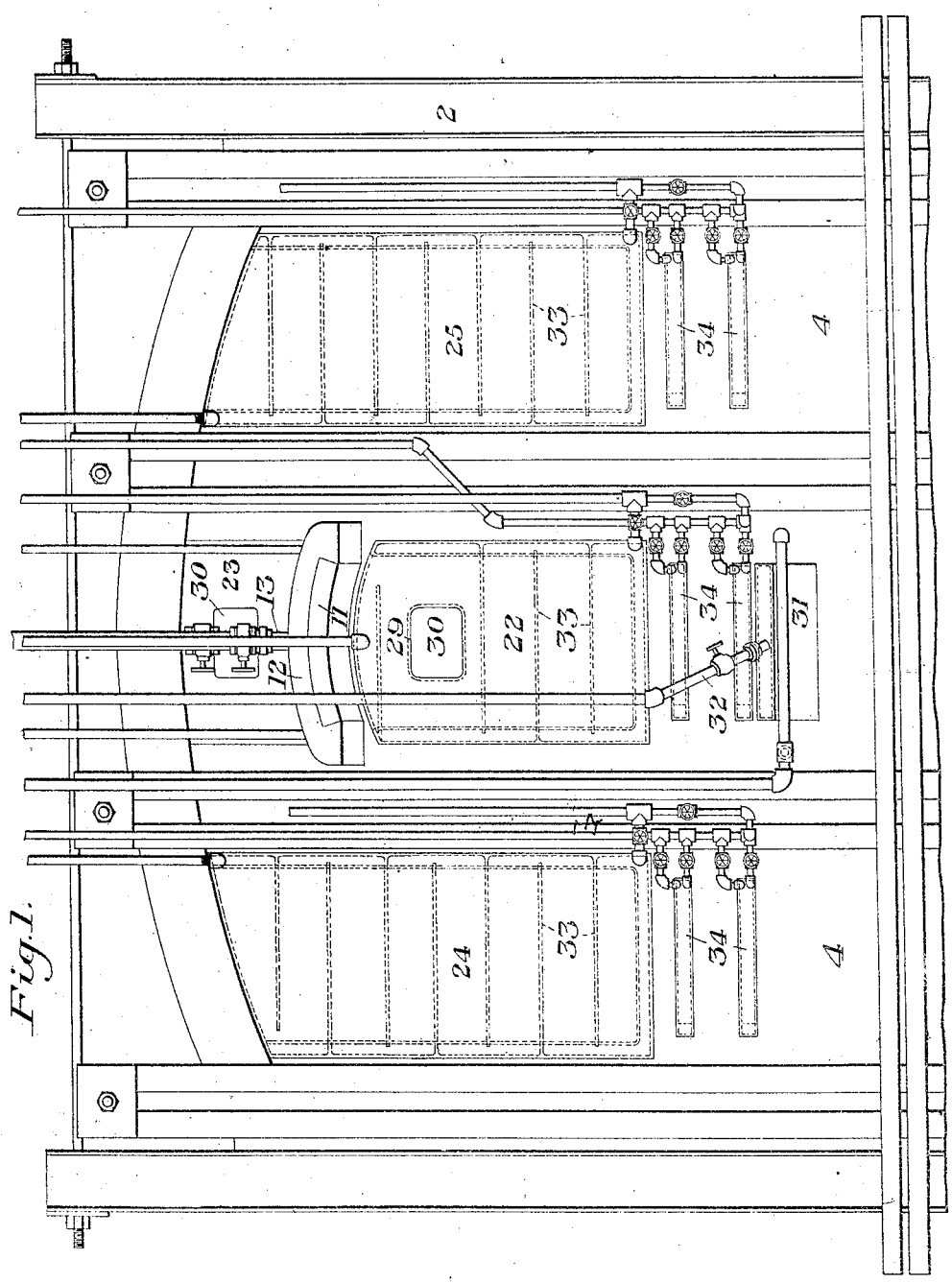

L. L. KNOX.
REGENERATIVE REVERSING FURNACE.
APPLICATION FILED AUG. 7, 1909.

951,644.

Patented Mar. 8, 1910.
6 SHEETS—SHEET 1.

WITNESSES
R A Balderson
Walter Famariss

INVENTOR
Luther L. Knox

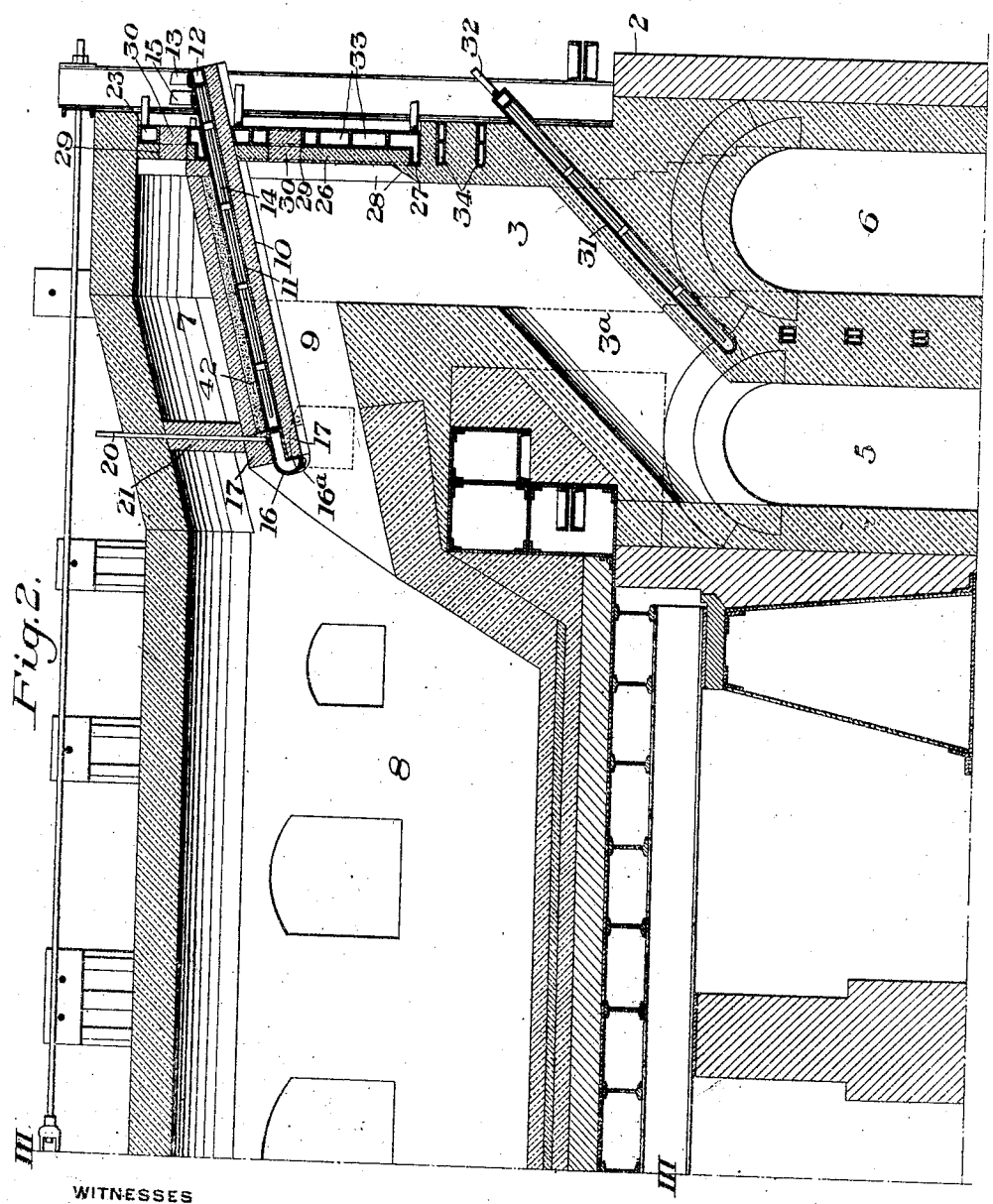

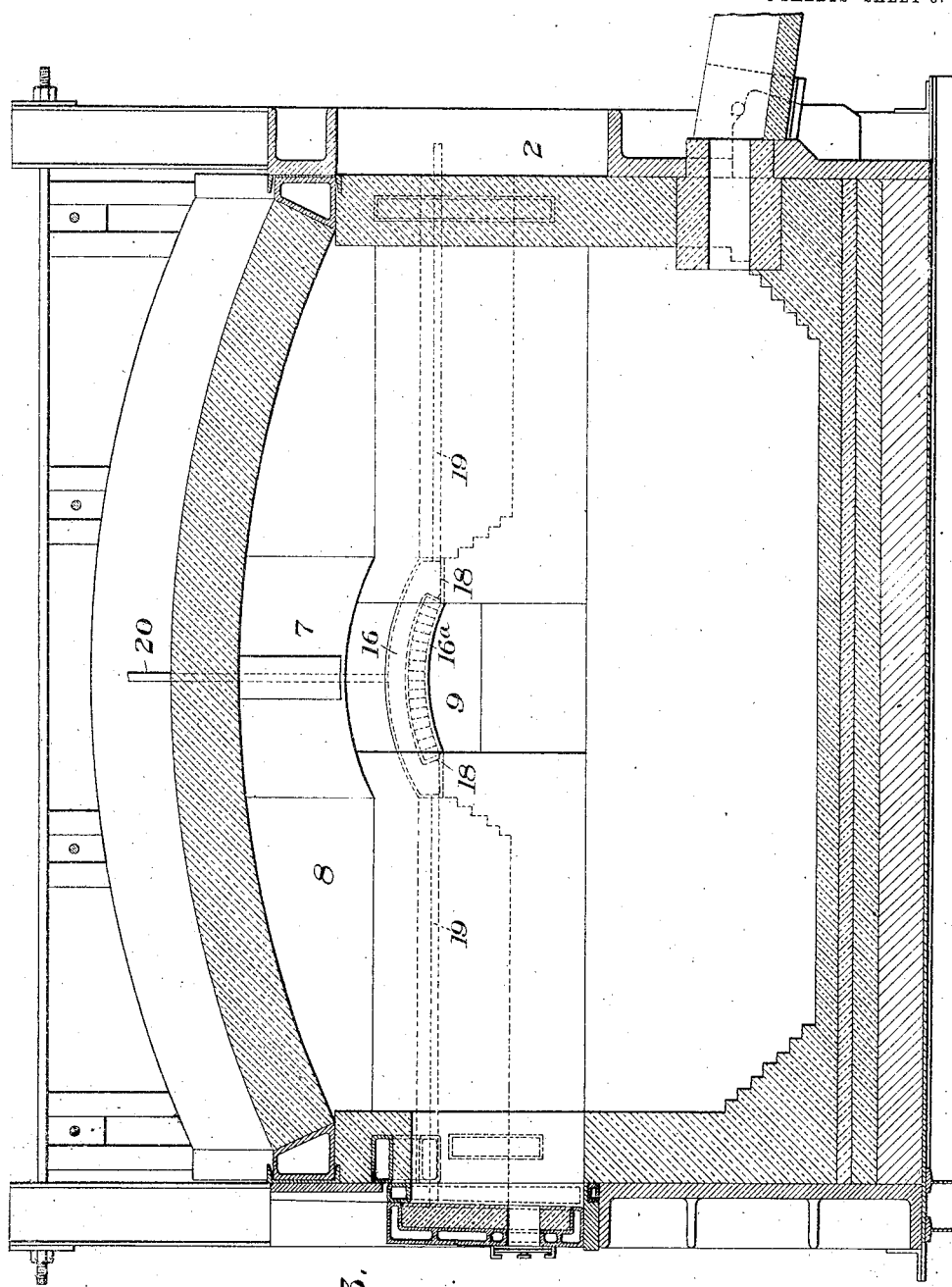

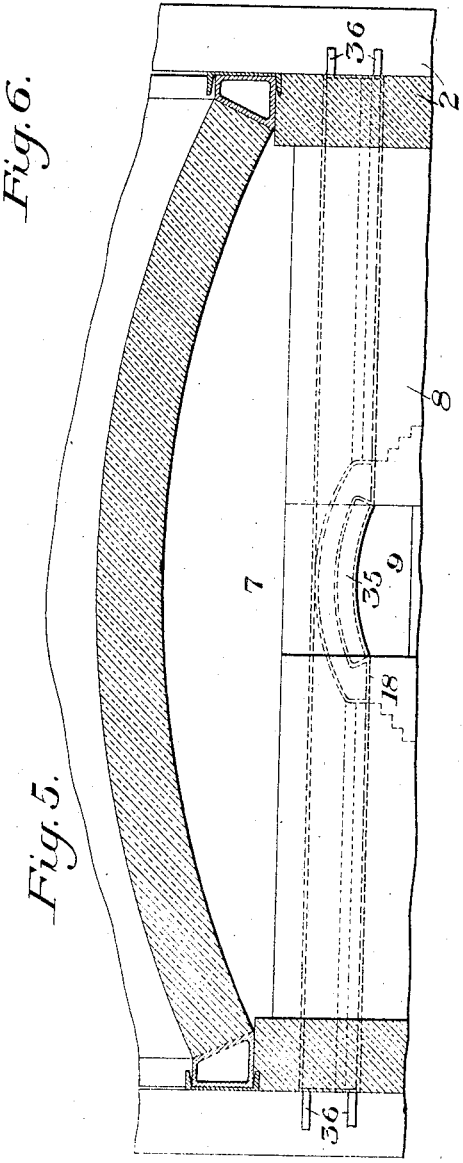

L. L. KNOX.
REGENERATIVE REVERSING FURNACE.
APPLICATION FILED AUG. 7, 1909.
951,644.
Patented Mar. 8, 1910.
6 SHEETS—SHEET 5.
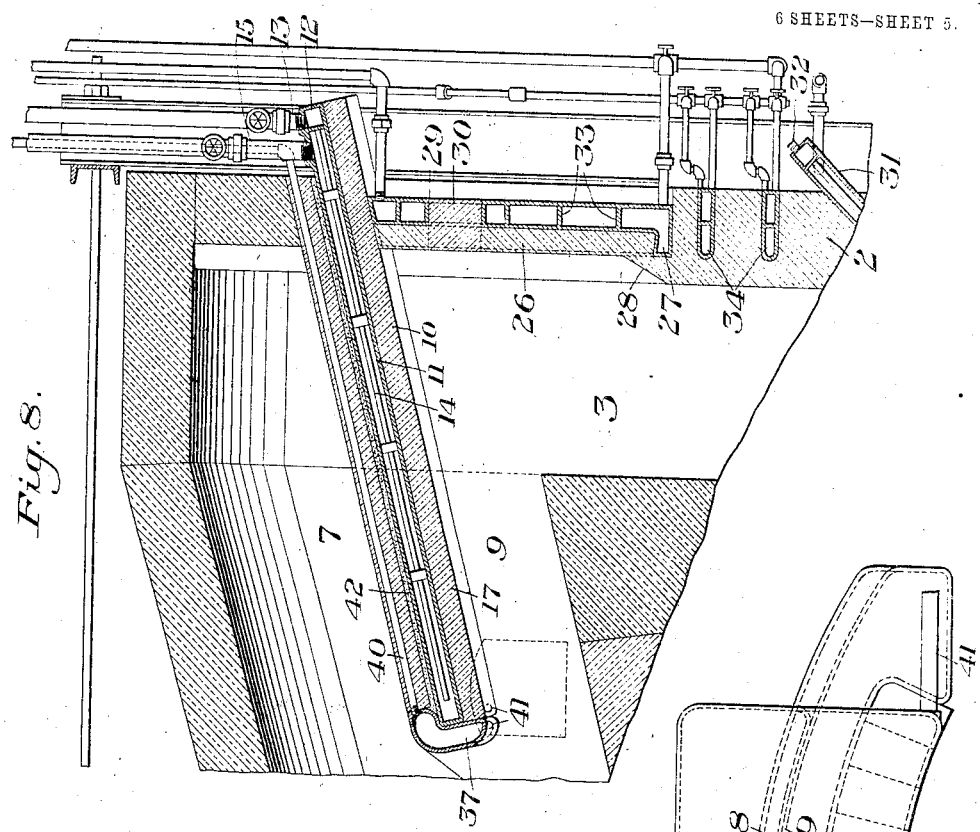
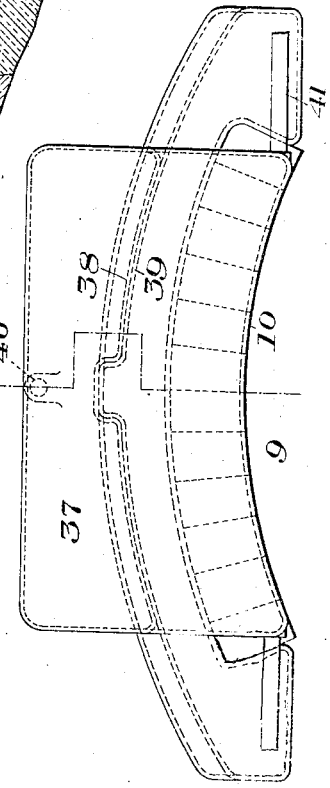
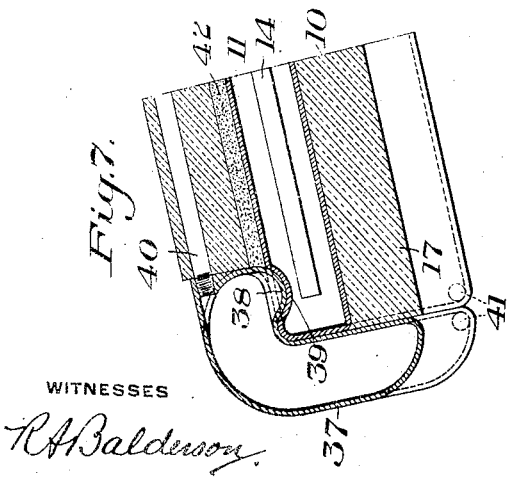
WITNESSES
INVENTOR L. L. KNOX.
REGENERATIVE REVERSING FURNACE.
APPLICATION FILED AUG. 7, 1909.
951,644.
Patented Mar. 8, 1910.
6 SHEETS—SHEET 6.
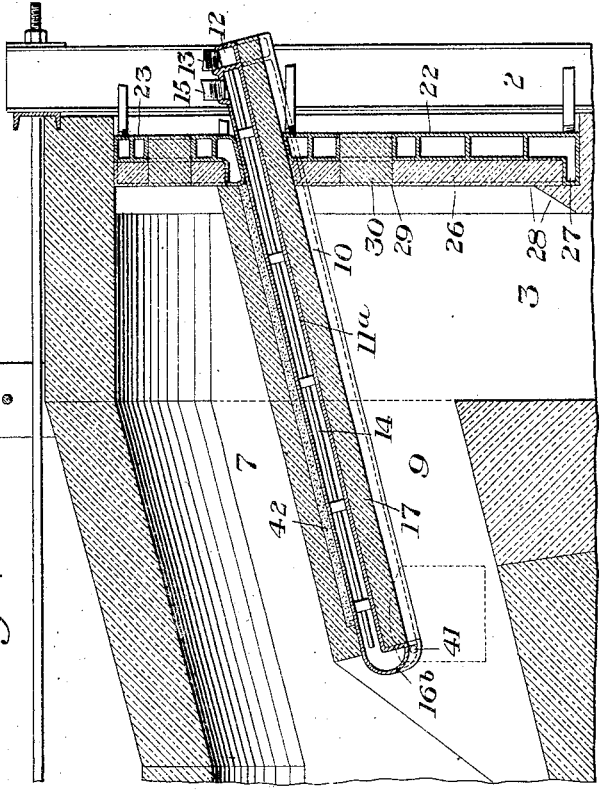
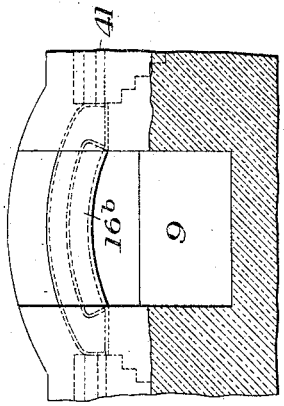
WITNESSES
INVENTOR
Luther L. Knox

UNITED STATES PATENT OFFICE.

LUTHER L. KNOX, OF BEN AVON, PENNSYLVANIA, ASSIGNOR TO KEYSTONE FURNACE CONSTRUCTION COMPANY, OF PITTSBURG, PENNSYLVANIA, A CORPORATION OF PENNSYLVANIA.

REGENERATIVE REVERSING-FURNACE.

951,644.   Specification of Letters Patent.   Patented Mar. 8, 1910.

Application filed August 7, 1909. Serial No. 511,724.

*To all whom it may concern:*

Be it known that I, LUTHER L. KNOX, of Ben Avon, Allegheny county, Pennsylvania, have invented a new and useful Improvement in Regenerative Reversing-Furnaces, of which the following is a full, clear, and exact description, reference being had to the accompanying drawings, forming part of this specification, in which—

Figure 1 is an end view of an open hearth furnace embodying my invention; Fig. 2 is a longitudinal section of one end portion of the furnace with the circulating pipes omitted; Fig. 3 is a section on the line III—III of Fig. 2; Figs. 4, 5, 6 are detail views showing a modified construction and arrangement of the means for protecting the arch; Figs. 7, 8 and 9 are detail views showing another modification of the same; and Figs. 10 and 11 are detail sectional views showing still another modification.

My invention has relation to regenerative reversing furnaces, and more particularly to means of novel character for protecting the walls of the gas and air uptakes and the arch separating the gas and air flues from the destructive action of the hot air and gases.

My invention, generally stated, consists in the novel arrangement of water-cooling means for the protection of these parts of the furnace, together with certain other features of construction and arrangement of parts, as more fully hereinafter described.

Referring first to the form of my invention shown in Figs. 1, 2 and 3, of the drawings, the numeral 2 designates the supporting walls and framework of an open hearth furnace of the regenerative reversing type and which may, in general, be of any approved construction. 3 designates the gas uptake leading from the regenerator, and 4 the air uptakes arranged one at either side of the central gas uptake. 5 is the slag pot at the lower end of the gas uptake, and 6 designates the slag pot of the air uptakes. 7 designates the air flue connecting the upper ends of the air uptakes with the furnace chamber 8, and 9 is the gas flue leading into the furnace chamber from the upper portion of the gas uptake. 10 is the wall or arch separating the air and gas flues 7 and 9. This wall or arch 10 consists of a body of refractory material having contained therein a hollow water-cooled box or casting 11. This box or casting may be of any suitable construction, such as that shown in detail in Fig. 6. As there shown, it is provided at its outer end, which extends through and beyond the outer wall or bulk head of the furnace, with an admission chamber 12, into which the cold water enters as by a suitable supply pipe 13. From this admission chamber the water passes by a series of pipes 14 to a point nearer the lower end of the casting where it is discharged. As the water becomes heated, it gradually rises to the upper end of the box or casting and passes out at the discharge pipe 15. As is well known, the inner end of nose portion of the arch or wall 10 is the part which is subjected to the most destructive action of the hot air and gases, and in practice, as heretofore constructed, this inner end or nose rapidly burns or cuts away. An important object of my invention is to protect this exposed inner end or nose of this arch or wall. This I accomplish in the form shown in Figs. 1, 2 and 3 by means of the supplemental cooling box or casting 16, which is in the form of an arch, as shown in Fig. 3, and which is provided with a partial covering 17, of refractory material at both its upper and lower sides. This box or casting 16 has an exposed portion 16ª, which protects inwardly beyond the refractory material and extends over the lower portion of the same in the manner shown, thereby preventing the direct contact of the hot gases therewith. This end or nose portion of the wall or arch is formed separately from the main body of the wall or arch and is supported on the side wall of the flue 9, as shown at 18 in Fig. 3. The box or casting 16 is provided with suitable water-circulating connections 19, and 20, the supply pipe 19 being shown as extending inwardly through the wall of the furnace and communicating with the box at its lowest point, while the outlet pipe 20 leads from the central arch top of the box at its highest point and thence upwardly through a protecting brick or block 21 of refractory material and out through the roof of the furnace, as shown in Fig. 2. This separate end or nose portion of the arch can be readily removed and replaced whenever necessary, without disturbing the main portion of said wall or arch. The cooling box or casting within the latter can also be readily removed and replaced at any time by disconnecting the circulating pipes and withdrawing it through the bulk head. In fact, the entire wall or arch 10 can be readily rebuilt, if necessary. The provision of the water-cooling means, as described, however, greatly extends the life of this wall or arch. The outer walls or bulk heads of the uptakes 3 and 4 are also protected by means of the cooling boxes or castings 22, 23, 24 and 25. These boxes or castings are protected by a substantial lining of refractory material 26. The castings 22, 24 and 25 are provided at their lower ends with the inward extensions 27, which support this lining, and in order that the inner portions of these extensions may be protected, the inner walls of the uptakes are offset outwardly, as shown at 28, thereby permitting a substantial thickness of the refractory lining 26 to be carried down in front of the extensions 27. The castings 22 and 23 are provided with one or more openings 29, normally filled with refractory material 30, which can be readily removed to permit a suitable poker or scraper or other cleaning tool to be introduced into the gas and air flues. The gas uptake 3 is provided with the inclined portion 3ª, and in order to protect the lower wall of this inclined portion, I provide the cooling box or casting 31, which extends obliquely within said wall, in the manner shown in Fig. 2, this box or casting being similar in its general form and arrangement to the box or casting 11, already described. It projects outwardly through the outer wall of the uptake, so that it can be readily removed, if necessary, and is provided with suitable water circulating connections 32. 33 designates water-circulating connections for the boxes or castings 22, 23, 24 and 25, these connections being best shown in Fig. 1. 34 designates smaller cooling boxes, which are preferably inserted in the outer wall of the gas and air uptakes and below the castings 22, 24 and 25.

Figs. 4, 5, 6 show a modified construction of an arrangement of means for protecting the inner end or nose of the wall or arch 10. In the construction and arrangement shown in these figures, I provide a hollow water-cooled box or casting 35, which extends across the inner end of said wall or arch, as shown in Fig. 4, and entirely across the furnace, as shown in Fig. 5. The central portion of this box or casting over the gas flue 9 is of arch form, as shown in Fig. 5, and the entire box or casting can be readily removed at either side of the furnace. 36 designates water-circulating connections for this box or casting. In Fig. 5, I have shown two sets of such connections, so arranged that the lower pipe at either side may be used for the inlet and the upper pipe at the opposite side for the outlet, the two sets being provided so that one may be used in case of injury to the other.

In the modification shown in Figs. 7, 8 and 9, the inner end or nose portion of the wall or arch 10 is formed by a hollow box or casting 37, which is supported on the side walls of the gas flue 9, at its ends, and which is also supported by a hook portion 38, engaging a recess or depression 39 in the box or casting 11. The box or casting 37 is directly exposed to the hot air and gases and can be readily removed and replaced when necessary. It effectually protects the entire inner end or nose of the wall or arch 10 from the cutting action of the hot air and gases. 40 designates circulating connections for this box or casting, which connections may, as shown, be carried through the refractory portion of the wall or arch 10.

The means for protecting the inner end or nose of the wall or arch 10 shown in Figs. 10 and 11, is similar to that shown in Figs. 1, 2 and 3, except that instead of forming the downwardly extending portion 16ᵇ in a separate piece, it is formed as an integral extension of the box or casting 11ª.

41, wherever seen in the several figures, designates clean-out connections for the boxes or castings 11, 11ª, 16 and 37. These connections provide means whereby the boxes may be flushed out when desired. They extend laterally through the side walls of the furnace and can be readily disconnected when necessary. In setting the cooling boxes or castings 11 and 11ª, I preferably place a body of sand or other relatively loose refractory material above the same within the wall or arch 10 as indicated at 42, in order to facilitate the removal of the boxes or castings when necessary.

The advantages of my invention result from the provision of means of the character described, whereby those portions of the gas and air uptakes or flues, which are most subject to the destructive action of the hot air and gases are protected.

It will be obvious that various changes may be made in the details of construction and arrangement of the parts. Thus, the form and construction of the several cooling boxes or castings may be changed together with the arrangement of the circulating connections. Said boxes or castings may be provided with any suitable arrangement of baffling, for securing the most effective water circulation therein and various other changes may be made within the spirit and scope of the appended claims.

While I have shown but one end portion of the furnace in the drawings, it will be readily understood that the uptakes and flues at both ends of the furnace may be similarly protected.

I claim:

1. A regenerative reversing furnace having a refractory wall or arch separating the gas and air flues, and a hollow water-cooled box or casting at the inner end of said wall or arch and covering the refractory material thereof to prevent contact of the hot gases therewith, substantially as described.

2. A regenerative reversing furnace having a refractory wall or arch separating the gas and air flues, and a hollow water-cooled box or casting at the inner end of said wall or arch, and forming the nose thereof, said box or casting covering the end surface of the arch and protecting the refractory material of the end portion of the arch, substantially as described.

3. In a regenerative reversing furnace, a wall or arch of refractory material separating the gas and air flues, and a water-cooled box or casting of arch form extending over the gas flue at the inner end of the wall or arch and entirely covering the refractory material thereof, substantially as described.

4. In a regenerative reversing furnace, a wall or arch separating the gas and air flues, and a water-cooled box or casting of arch form extending over the gas flue at the inner end of the wall or arch, said box or casting being removable through a side wall of the furnace, substantially as described.

5. In a regenerative reversing furnace, a wall or arch of refractory material separating the gas and air flues, and a hollow box or casting extending transversely across the inner end of said wall or arch and covering over and protecting the refractory material thereof, substantially as described.

6. In a regenerative reversing furnace, a wall or arch of refractory material separating the gas and air flues, and a hollow box or casting extending transversely across the inner end of said wall or arch and protecting the refractory material thereof, said box being removable at one side of the furnace through the wall thereof, substantially as described.

7. A regenerative reversing furnace having a wall or arch separating its gas and air flues, the inner end or nose portion of said wall or arch comprising a hollow water-cooled member extending downwardly to the lower surface of the wall or arch and fitting close against and covering over that part of the end surface of the wall or arch which it abuts, substantially as described.

8. A regenerative reversing furnace having a wall or arch separating the gas and air flues, and a hollow water-cooled box or casting extending transversely at the inner end of said wall or arch and having an exposed portion covering over and protecting the inner end of the lower portion of said wall or arch, substantially as described.

9. A regenerative reversing furnace having a wall or arch separating its gas and air flues, and a hollow water-cooled box or casting forming the inner end or nose portion of said wall or arch, said box or casting covering over the refractory material at the inner end of the arch and being removably supported, substantially as described.

10. A regenerative reversing furnace having a wall or arch separating its gas and air flues and having a cooling box or casting contained therein, and a supplemental cooling box or casting extending transversely at the inner end of said wall or arch and having an exposed portion, substantially as described.

11. In a regenerative reversing furnace, an up-take having its outer wall or bulk head below the arch separataing the gas and air flues provided with a water-cooled box or casting having an inner lining of refractory material, said box or casting having means for supporting said lining, said box or casting fitting underneath the said arch at its upper end; substantially as described.

12. In a regenerative reversing furnace, an uptake having its outer wall or bulk head provided with a water-cooled box or casting, said box or casting having an opening therethrough, and a removable filling of refractory material for said opening and seated within the said opening, substantially as described.

13. In a regenerative reversing furnace, an uptake port or passage having an inclined portion, and a water-cooled box or casting inserted in the lower wall of such portion and substantially parallel with the inner surface of such wall, substantially as described.

14. In a regenerative reversing furnace, an uptake port or passage having an inclined portion, and a water-cooled box or casting inserted in the lower wall of such portion and substantially parallel with the inner surface of such wall, said box or casting being removable through the end wall of the uptake, substantially as described.

15. In a regenerative reversing furnace, a wall or arch separating the gas and air ports and comprising a body of refractory material having a hollow water-cooled box or casting contained therein, and a filling of relatively loose refractory material partially surrounding said box or casting, substantially as described.

16. In a regenerative reversing furnace, a wall or arch separating the gas and air flues and composed of a body of refractory material having a hollow water-cooled box or casting removably supported therein and having a separate nose portion also provided with a water-cooled box or casting, one of said boxes or castings being removable at the outer end of the wall or arch, and the other being removable through a side wall of the furnace, substantially as described.

17. A regenerative reversing furnace having a wall or arch separating its gas and air flues, and a gas up-take leading upwardly to the gas flue, said up-take having separate bulk heads or end walls above and below the said arch composed of a water-cooled box or casting, and a refractory lining supported thereby; substantially as described.

18. A regenerative reversing furnace having an arch separating its gas and air flues, said arch comprising a body of refractory material having water-cooling means embedded therein, and a hollow water-cooling member extending transversely across the inner end of said arch and forming the nose thereof, said member covering over and protecting the refractory material at the inner end of the arch; substantially as described.

19. In a regenerative reversing furnace, a wall or arch of refractory material separating the gas and air flues, and a water-cooling member forming the inner end or nose of said arch, said member having means for circulating water therethrough, and also having a clean-out connection which is independent of the water-circulating connections; substantially as described.

20. In a regenerative reversing furnace, a wall or arch of refractory material separating the gas and air flues, and a cooling means embedded in said wall or arch, and having a portion beyond the end of the arch and abutting the same; substantially as described.

In testimony whereof, I have hereunto set my hand.

LUTHER L. KNOX.

Witnesses:
A. F. TIBBETS,
H. M. CORWIN.